United States Patent
Paul et al.

(10) Patent No.: US 10,129,219 B1
(45) Date of Patent: Nov. 13, 2018

(54) METHODS AND SYSTEMS FOR SECURING DATA STORED AT A STORAGE AREA NETWORK

(71) Applicant: QLOGIC Corporation, Aliso Viejo, CA (US)

(72) Inventors: Somnath Paul, Fremont, CA (US); Bruce A. Klemin, Rocklin, CA (US); Muralidhar Jammula, Saratoga, CA (US)

(73) Assignee: Cavium, LLC, Santa Clara, CA (US)

( * ) Notice: Subject to any disclaimer, the term of this patent is extended or adjusted under 35 U.S.C. 154(b) by 206 days.

(21) Appl. No.: 15/169,466

(22) Filed: May 31, 2016

(51) Int. Cl.
*H04L 9/14* (2006.01)
*H04L 29/06* (2006.01)
*H04L 9/06* (2006.01)

(52) U.S. Cl.
CPC ........ *H04L 63/0428* (2013.01); *H04L 9/0625* (2013.01); *H04L 9/14* (2013.01); *H04L 63/0471* (2013.01)

(58) Field of Classification Search
CPC ...... H04L 9/14; H04L 63/0428; H04L 9/0625
USPC ........................................................ 713/160
See application file for complete search history.

(56) References Cited

U.S. PATENT DOCUMENTS

| 8,914,858 | B2 * | 12/2014 | Maino | H04L 63/12 726/6 |
| 9,317,718 | B1 * | 4/2016 | Takahashi | G06F 21/72 |
| 9,374,344 | B1 * | 6/2016 | Takahashi | H04L 63/0428 |
| 2004/0143734 | A1 * | 7/2004 | Buer | H04L 63/0428 713/153 |
| 2005/0120141 | A1 * | 6/2005 | Zur | H04L 29/06 709/249 |
| 2008/0052511 | A1 * | 2/2008 | Fascenda | H04L 63/0428 713/160 |
| 2012/0200633 | A1 * | 8/2012 | Aoyama | B41J 2/155 347/20 |
| 2016/0127894 | A1 * | 5/2016 | Kahn | H04W 12/04 380/270 |
| 2016/0315918 | A1 * | 10/2016 | Pollet | H04L 63/0435 |

\* cited by examiner

*Primary Examiner* — Lynn D Feild
*Assistant Examiner* — Dereena T Cattungal
(74) *Attorney, Agent, or Firm* — Klein, O'Neill & Singh, LLP

(57) ABSTRACT

Methods and systems for securing data are provided. For example, one method includes providing context information for an input/output (I/O) operation to a security module by an adapter communicating with a computing device and a storage device via a network; storing encryption parameters associated to a security association handle by the security module; using a workflow handle by the security module to obtain the security association handle for retrieving stored encryption parameters for encrypting payload transmitted by the adapter and for decrypting payload received by the adapter; predicting a first frame header for encrypting the payload transmitted by the adapter and a second frame header for decrypting payload received by the adapter; providing the encrypted payload for transmission to the adapter by the security module, after discarding the first predicted header; and providing the decrypted payload to the computing device by the security module, after discarding the second predicted header.

20 Claims, 8 Drawing Sheets

US 10,129,219 B1

METHODS AND SYSTEMS FOR SECURING DATA STORED AT A STORAGE AREA NETWORK

TECHNICAL FIELD

The present invention relates to securing data.

BACKGROUND

Computing systems typically use adapters for sending data to and receiving data from mass storage devices. It is desirable to secure the data that is sent and received by the adapters. Continuous efforts are being made to efficiently secure data.

BRIEF DESCRIPTION OF THE DRAWINGS

The various aspects relating to securing data network now will be discussed in detail with an emphasis on highlighting the advantageous features. These novel and non-obvious aspects are shown in the accompanying drawings, which are for illustrative purposes only. These drawings include the following figures, in which like numerals indicate like parts.

DETAILED DESCRIPTION

Figure 1A:
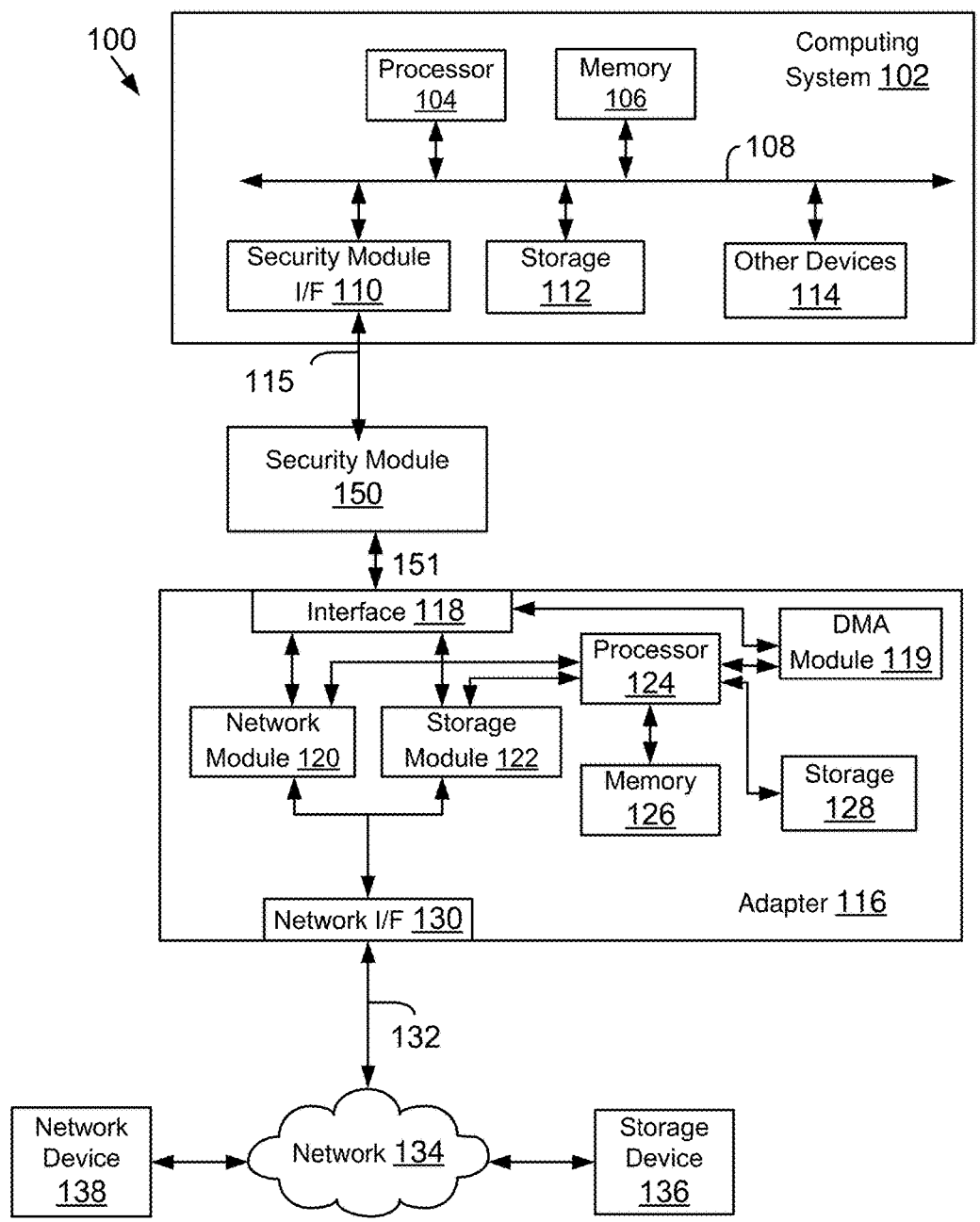
FIG. 1A is a functional block diagram of system with a security module coupled to a computing system and an adapter, according to one aspect of the present disclosure.

The following detailed description describes the various present aspects with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), manual processing, or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.).

The various aspects disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

In one aspect, methods and systems for securing data are provided. For example, one method includes providing context information for an input/output (I/O) operation to a security module by an adapter communicating with a computing device and a storage device via a network; storing encryption parameters associated to a security association handle by the security module; using a workflow handle by the security module to obtain the security association handle for retrieving stored encryption parameters for encrypting payload transmitted by the adapter and for decrypting payload received by the adapter; predicting a first frame header for encrypting the payload transmitted by the adapter and a second frame header for decrypting payload received by the adapter; providing the encrypted payload for transmission to the adapter by the security module, after discarding the first predicted header; and providing the decrypted payload to the computing device by the security module, after discarding the second predicted header.

System 100:

FIG. 1A shows an example of a system 100 configured for use with the various aspects of the present disclosure. System 100 may include one or more computing system 102 (may also be referred to as "host system 102") coupled to a security module 150 via a security module interface 110 and a link 115. The security module 150 interfaces with an adapter 116 via a link 151. Links 115 and 151 may be an interconnect system, for example, PCI-Express (PCIe) links or any other interconnect type. The adapter 116 interfaces with a network 134 via a network connection 132. The network 134 may include, for example, additional computing systems, servers, storage systems, etc. The security module 150 is used to secure data before data is stored at a storage device and decrypt secured data that is received from the network 134, described below in detail.

The computing system 102 may include one or more processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The processor 104 executes computer-executable process steps and interfaces with an interconnect (or computer bus) 108. The computer bus 108 may be, for example, a system bus, a Peripheral Component Interconnect (PCI) bus (or PCI-Express (PCIe) bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

The computing system 102 also includes other devices and interface 114, which may include a display device interface, a keyboard interface, a pointing device interface, etc. Details regarding the other devices 114 are not germane to the aspects disclosed herein.

The computing system 102 may further include a storage device 112, which may be for example a hard disk, a CD-ROM, a non-volatile memory device (flash or memory stick) or any other mass storage device. Storage 112 may store operating system programs and data structures, application program data, and other data. Some of these files are stored on storage 112 using an installation program. For example, the processor 104 may execute computer-executable process steps of an installation program so that the processor 104 can properly execute the application program.

Memory 106 also interfaces with the computer bus 108 to provide the processor 104 with access to memory storage. Memory 106 may include random access main memory (RAM) or any other memory type. When executing stored computer-executable process steps from storage 112, processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

Adapter 116 interfaces with the host system 102 via the security module 150. In another aspect, both adapter 116 and security module 150 directly interface with the host system 102 and communicate with each other using mailbox registers at the host system (not shown). In one aspect, adapter 116 may be configured to handle both network and storage traffic. Various network and storage protocols may be used to handle network and storage traffic. Some common protocols/technologies are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support higher data transfer rates for example, above 100 Mbps. The descriptions of the various aspects described herein are based on using Ethernet (which includes 100 Base-T and/or Gigabit Ethernet) as the network protocol. However, the adaptive aspects disclosed herein are not limited to any particular protocol, as long as the functional goals are met by an existing or new network protocol.

One common storage technology used to access storage systems is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

Fibre Channel over Ethernet (FCOE) has been developed to handle both Ethernet and Fibre Channel traffic in a storage area network (SAN). This functionality enables Fibre Channel to leverage high-speed Ethernet networks while preserving the Fibre Channel protocol. The adapter 116 shown in FIG. 1A may be configured to operate as an FCOE adapter and may be referred to as FCOE adapter 116. The illustrated adapter 116, however, does not limit the scope of the present aspects. The present aspects may be practiced with adapters having different configurations.

Referring back to FIG. 1A, adapter 116 interfaces with the security module 150 102 via the link 151 and interface 118. In one aspect, interface 118 may be a PCI Express interface having logic/circuitry for sending and receiving PCI-Express packets.

The adapter 116 may also include a processor 124 that executes firmware instructions out of a memory 126 to control overall adapter operations. The adapter 116 may also include local storage 128, which may be for example non-volatile memory, such as flash memory, or any other device. The local storage 128 may store executable instructions and operating parameters that can be used for controlling adapter operations.

The adapter 116 includes a network module 120 for handling network traffic via a link 132. In one aspect, the network module 120 includes logic and circuitry for handling network packets, for example, Ethernet or any other type of network packets. The network module 120 may include memory buffers (not shown) to temporarily store information received from other network devices 138 and transmitted to other network devices 138.

The adapter 116 may also include a storage module 122 for handling storage traffic to and from storage devices 136. The storage module 112 may further include memory buffers (not shown) to temporarily store information received from the storage devices 136 and transmitted by the adapter 116 to the storage devices 136. In one aspect, the storage module 122 is configured to process storage traffic according to the Fibre Channel storage protocol, or any other protocol. It is noteworthy that adapter 116 may only have a network module 120 or a storage module 122. The various aspects described herein are not limited to any particular adapter type.

The adapter 116 also includes a network interface 130 that interfaces with link 132 via one or more ports (not shown). The network interface 130 includes logic and circuitry to receive information via the network link 132 and pass it to either the network module 120 or the storage module 122, depending on the packet type.

Adapter 116 also includes a direct memory access (DMA) module 119 that is used to manage access to link 151. The DMA module 119 uses a plurality of DMA channels (not shown) for managing access to link 151. The DMA channels are typically used to move control structures such as Input/Output control blocks (IOCBs), input/output status blocks (IOSBs) and data between host system memory 106 and the adapter memory 126 via the security module 150.

Figure 1B:
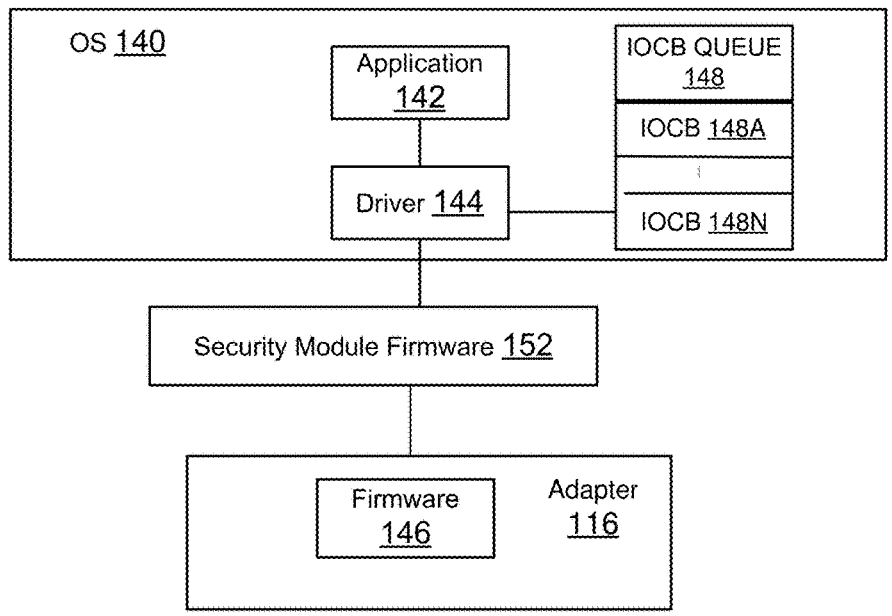
FIG. 1B shows a block diagram of a generic architecture used by the system of FIG. 1A.

Software Architecture:

FIG. 1B shows an example of a generic software architecture used by the various components of system 100. Processor 104 of the host system 102 executes an operating system 140 for controlling the overall operations of host computing system 102. The operating system may be Windows based, Linux operating system, Solaris, or any other operating system type (without derogation of any third party trademark rights). The aspects disclosed herein are not limited to any particular operating system type.

An application 142 may be executed by processor 104 for performing certain functions. For example, application 142 may be an email program, a database application or any other application type. Application 142 may send a command to a host driver 144 for performing an operation, for example, reading and/or writing data (input/output (I/O) at another storage device. The driver 144 processes the request and communicates with firmware 146 executed by processor 124 of adapter 116 via the security module firmware/instructions 152 executed by the security module 150. A component of adapter 116 then processes the request. The firmware of adapter 116 communicates with the security module 150 for encrypting or decrypting data, as described below in detail.

Typically for managing data transfers across links 115/151, an IOCB (Input Output Control Block) is first generated by the driver 144 and saved at an IOCB queue 148, shown as 148A-148N. The IOCB queue 148 may be at host memory 106 or any other location. The IOCB is obtained by adapter 116 which may be to provide data to host processor 104 or to send data provided by host processor 104. Both IOCB fetch and data transfer operations are performed using DMA operations via DMA channels. Based on the IOCB, adapter 116 executes the operations that may be needed. Adapter 116 then uses DMA operation to send a status block (IOSB) to processor 104 indicating the completion of IOCB execution and associated data transfer.

Figure 1C:
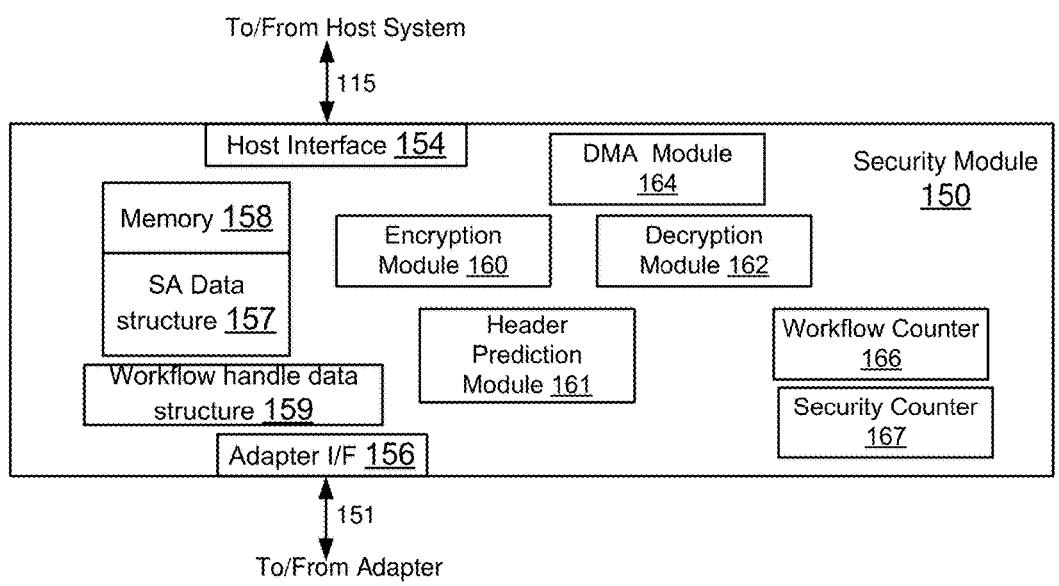
FIG. 1C shows a block diagram of a security module, according to one aspect of the present disclosure.

Security Module 150:

FIG. 1C shows an example of the security module 150, according to one aspect of the present disclosure. As an example, security module may be a FPGA (Field Programmable Gate array). In another aspect, security module 150 maybe an ASIC. The security module 150 communicates with the host 102 via the host interface 154 and link 115. The security module 150 also communicates with adapter 116 via adapter interface 156 and link 151. As mentioned above, links 115 and 151 maybe PCIe links. Interface 154 and 156 include logic and circuitry to process PCIe packets. DMA module 164 is used to manage access to links 115 and 151.

The security module 150 includes or has access to a memory 158, which maybe a double data rate (DDR) synchronous dynamic random-access memory or any other memory type. Memory 158 is used to store one or more security association (SA) data structures 157 that are used to encrypt and decrypt data, as described below in detail. The security module 150 also stores a workflow handle data structure 159 that is used to lookup a security association handle that operates as an index key for obtaining encryption parameters from data structure 157, as described below in detail.

The security module 150 further includes an encryption module 160 that can encrypt outgoing data (i.e. data to other devices from host memory 106) using different algorithms, for example, 3DES/DES, AES and other algorithm types. The security module 150 also includes a decryption module 162 with logic and circuitry for decrypting secured data that is received from other devices (for example, storage device 136). In one aspect, a header prediction module 161 of the security module 150 is used to predict a frame header of an encrypted frame, as described below in detail. It is noteworthy that the header prediction module 161 may be integrated with the encryption module 160 and/or decryption module 162.

The security module 150 also maintains a workflow counter 166 that is used track data that is received at the security module 150 and to determine when a last frame for an I/O sequence is received, as described below in detail. The security module 150 also includes a security counter 167 for tracking encryption headers, described below in detail. Before describing the various processes of the present disclosure, the following describes the structure of an encrypted Fibre Channel frame.

Figure 2A:
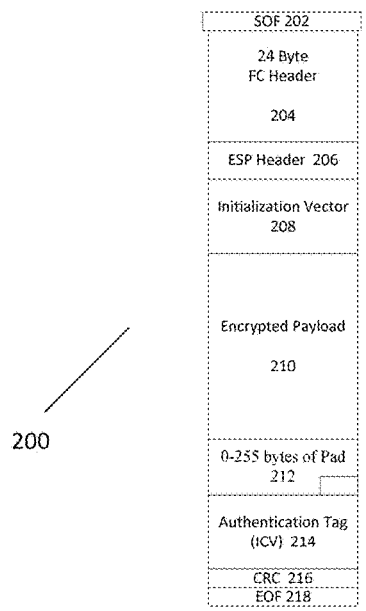
FIG. 2A shows an example of an encrypted Fibre Channel frame, used according to one aspect of the present disclosure.

Encrypted Fibre Channel Frame:

FIG. 2A shows an example of an encrypted Fibre Channel frame 200 for implementing the methods and systems, described herein. As an example, the frame 200 includes a start of frame (SOF) field 202 that indicates the beginning of the frame. The frame includes a 24 byte header 204 that is reproduced below with various fields, for example, R_CTL: a routing control field; CS-CTL field that assigns a frame's priority; a Type field indicating the frame type; D_ID: a field that identifies a destination; S_ID: a source identifier; and F_CTL: a flag for frame control (e.g. abort and others).

The SEQ_ID is an unsigned binary number identifying the sequence of which the frame is a part. The SEQ_ID is assigned by a sequence initiator and is unique for a specific D_ID and S_ID pair, while the sequence is open. The SEQ_CNT is an unsigned binary number identifying the order of frame transmission within a single sequence or multiple consecutive sequences for the same exchange. For example, 0 maybe the first frame, 9 the tenth frame, and so on. The sequence count of each subsequent data frame is incremented by one.

OX_ID is the originator exchange ID field that identifies an exchange ID assigned by an originator of an exchange. This field is also used by the originator exchange status block to track the progress of a series of sequences that comprise an exchange.

RX_ID is the responder exchange ID field assigned by a responder to provide a unique identifier for an exchange established by an originator and identified by an OX_ID. The "Parameter" field is a relative offset for data or link control information. The DF-CTL field (shown as 219) provides control flags and maybe used to indicate if a frame is encrypted or not.

In one aspect, frame 200 also includes an encapsulation security payload (ESP) header 206. The ESP header 206 includes a security parameter index (SPI) for identifying an entry at the security data structure 157 stored at memory 158, which may be a random access memory (RAM). The SPI may be a 4 bytes field and has its own keys, sequence number and salt values. To perform encryption or decryption, SPI is used as an index for a lookup operation to retrieve all the encryption parameters. The data structure 157 identifies a key and the algorithm used for encrypting data.

In one aspect, before an I/O or exchange, driver 144 associates a workflow handle for the I/O with a security association handle at the workflow handle data structure 159 (FIG. 1C). The workflow handle is used to lookup the security handle from data structure 159. The security handle then enables a lookup of encryption parameters from data structure 157.

Figure 2B:
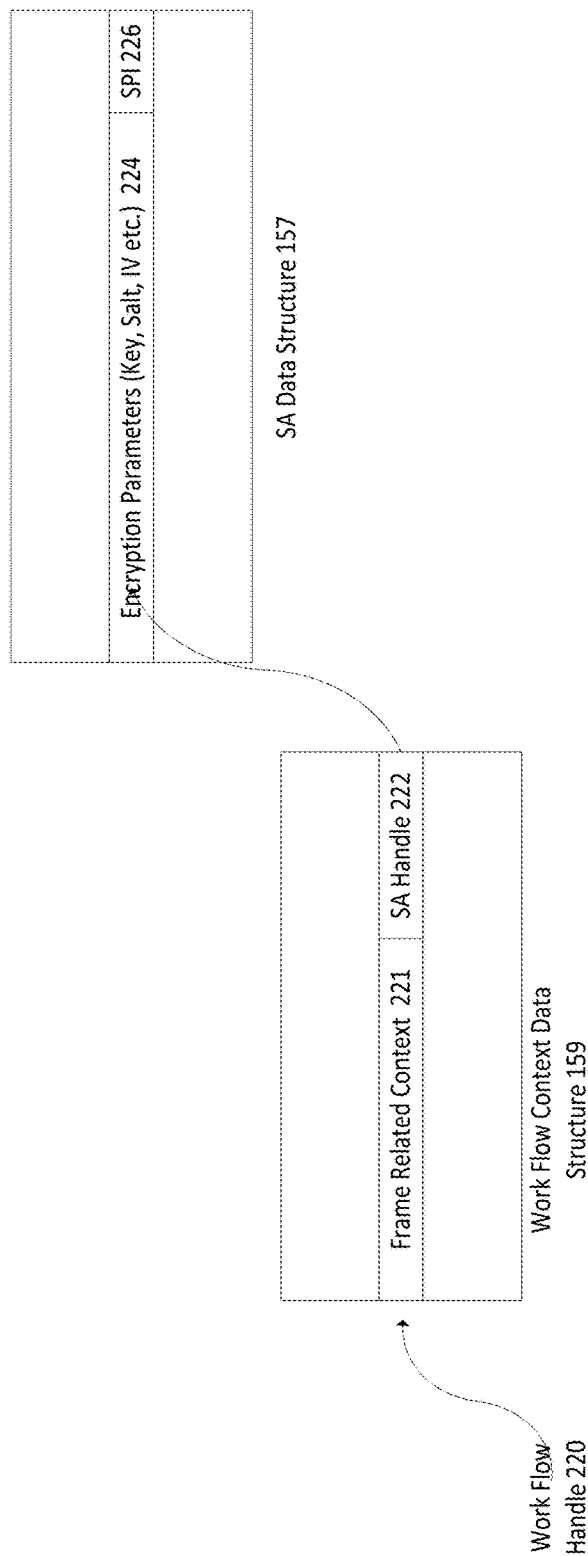
FIG. 2B shows an example of using a security handle to retrieve encryption parameters, according to one aspect of the present disclosure.

FIG. 2B shows an example of a lookup operation using a workflow handle 220 to look-up a SA handle 222 that is associated with a frame related context 221. The SA handle 222 provides the encryption parameters 224 that are associated with a SPI 226. It is noteworthy that the data structures 157 and 159 may be stored at different memories or at the same memory.

Referring back to FIG. 2A, frame 200 also includes an initialization vector (IV) 208 that is used for encrypting and decrypting payload 210. A padding 212 is used to indicate the amount to adjust after decrypting the encrypted payload 210.

An authentication tag 214 of frame 200 includes a hash of the frame header, the security parameter index, payload data and padding 212 with a common key between two communicating nodes. In one aspect, the authentication tag 214 and the frame header 204 are used to verify that the frame is received from an authorized node. The frame 200 also includes cyclic redundancy code (CRC) 216 and an end of frame (EOF) field 218 that indicates the end of a frame.

In one aspect, only the payload 210 of the frame is encrypted. In another aspect, other portions of the frame may be encrypted as well.

The FC-SP-2 standard requires authentication of an entire FC frame that includes header bytes with some exceptions, for example, the CS-CTL/Priority field, D_ID and S_ID fields. Ideally, the encryption/decryption and authentication of the frame should be done at the FC transport layer that is executed by adapter 116 and the adapter 116 has access to header bytes. However, the process for adding encryption in existing adapters 116 is not cost-effective. Instead the dedicated security module 150 performs the decryption/encryption, while making it appear that the encryption and decryption is being done at the FC-2 layer, as described below in detail.

SA Handle Lookup/Header Prediction:

In one aspect, since adapter 116 receives the encrypted frame, it processes the header and then drops the header bytes. To perform encryption/decryption, the security module 150 has to predict the header bytes and replicate the same authentication because the adapter 116 continues to operate without any changes for both encrypted and non-encrypted frames.

In one aspect, many header fields, including R_CTL, Type, SEQ_ID, OX_ID and RX_ID remain constant for an entire I/O sequence. An I/O sequence is for reading data from the storage device 136 or transmitting data to the storage device 136. Depending on the request, the sequence may have one or more frames. The other fields are predicted by the security module 150 based on the context information that is received from the adapter 116 at the beginning of each I/O sequence, as described below in detail.

In one aspect, at the beginning of each I/O sequence, the OX_ID, RX_ID and SEQ_ID are received by the security module 150 from driver 144. These values are used for each received frame. The SEQ_CNT increments every frame. When the first frame is received, the SEQ_CNT is initialized. The frame payload size is fixed (for example, 2k), except the last frame. In another aspect, the padding length may be fixed as well for all non-last frames, for example, 30 bytes and the last frame padding bytes may be 2 bytes, which will make the last frame smaller than non-last frames. The security module 150 detects the frame boundaries based on the number of transferred bytes. For example, if the frame payload is 1984 bytes, the frame boundary is detected every 2K bytes. The process of detecting the last frame of a sequence by the security module 150 is described below with respect to FIG. 4. The following provides details of other fields that are used for predicting the frame header, The Control Field bits provides the following information:
 0—If SCSI is set in the Protocol Selection bit:
  0—Read
  1—Write
 If SB2 is set in the Protocol Selection bit:
  0—selects 0x1B type
  1—selects 0x1C type
 1—(Defined for a different purpose not relevant to the header prediction).
 2—Priority bit
 3—Protocol selection bit
  0: SCSI
  1: SB2
 4—(Defined for a different purpose not relevant to the header prediction).
 5—If set, do not update the SEQ_CNT field with the value provided in this context.
 6—L. If set, for authentication purposes the L bit (bit 20) in the F_CTL field is set for every frame in the sequence.
 7—F. If set, for authentication purposes the F bit (bit 21) in the F_CTL field is set for every frame in the sequence.

R_CTL Field and DF_CTL Field: (1 byte each)
A constant value of 0x01 is used for R_CTL and a value of 0x40 for all frames since this feature is used only for Solicited Data and with no optional headers except for the ESP header.

Type Field (1 byte)
In one aspect, the security module 150 supports 3 different values of the Type field and so based on Bits 0 and 3 of the Control field, the security module 150 determines the Type Field of a FC Header, which remains constant for all frames in an I/O sequence of multiple frames:
 If Bit[3]=0, Type=0x08 (SCSI-FCP Protocol)
 Else if Bit[0]=10, Type=0x1B (FC-SB-3—Channel)
 Else if Bit[0]=11, Type=0x1C (FC-SB-3—Control Unit)

F_CTL Field (3 bytes)
Except for Bits 16 and 19, all the other bits are constant for all frames in the I/O.
 Bits[15:0]=0x0008
 Bit[16]=Set to 1 only for Last frame for SCSI protocols and if in Write Mode (i.e. Bit[3,0] of Control=01)
 Bit[17]=Priority Bit (i.e. Bit 2 of Control)
 Bit[18]=0
 Bit[19]=Set to 1 for Last Frame
 Bit[20]=L Bit (i.e. Bit 6 of Control)
 Bit[21]=F Bit (i.e. Bit 7 of Control)
 Bit[22]=0
 Bit[23]=Set to 1 for SCSI protocols and if in Read Mode (i.e. Bit[3,0] of Control=00)

Figure 3A:
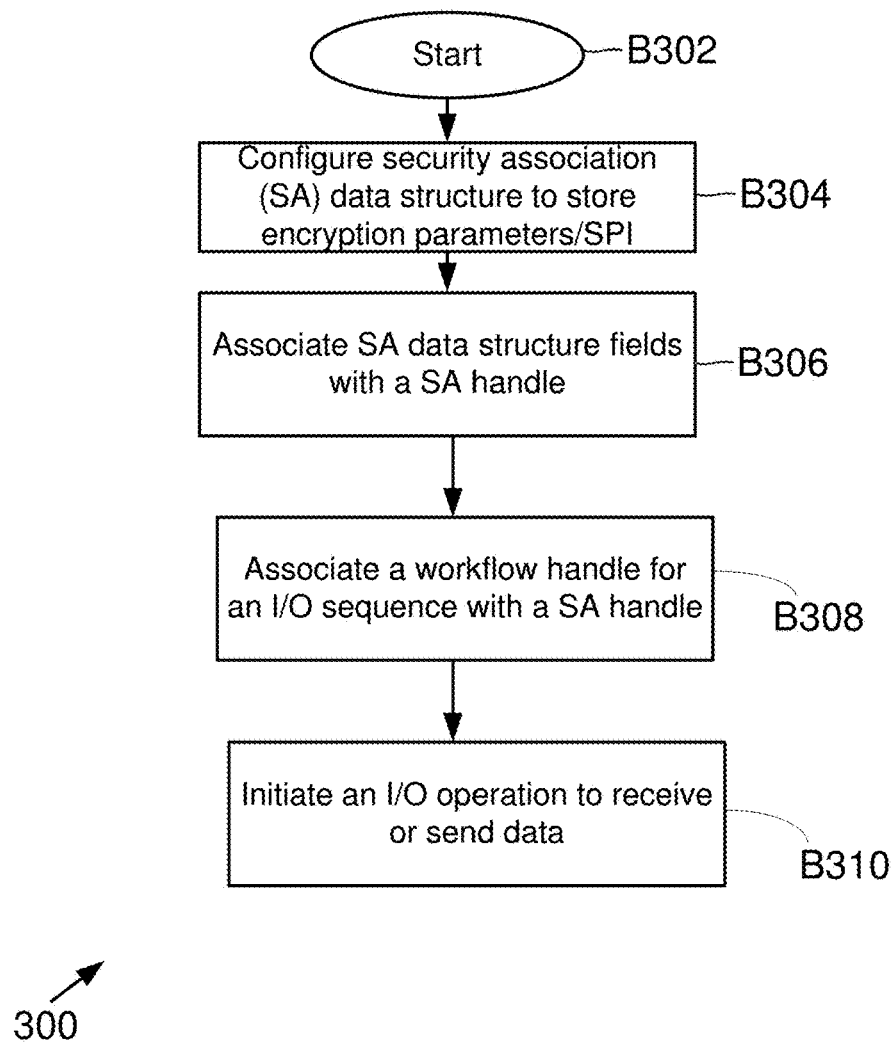
FIGS. 3A-3C show various process flows for using a security module, according to one aspect.

Process Flows:
FIG. 3A shows a process 300 for configuring the SA data structure 157/workflow handle data structure 159, according to one aspect of the present disclosure. The process begins in block B302, when the host system 102, adapter 116 and the security module 150 are initialized and operational.

In block B304, the data structure 157 is configured. The data structure 157 is used to store encryption parameters 224 and the SPI 226. The security counter 167 is initially set to 1 and after each transmitted frame, is increased by 1. In one aspect, the security counter 167 maybe 64 bits where the lower 32 bits are used for an ESP sequence number and the other bits for the initialization vector IV). Thus, one counter is used for tracking both the fields.

In block B306, frame related context 221 is associated with the security handle 222. Thereafter, in block B308, a workflow handle 220 is associated with the security association handle 222. The security association handle 222 points to an entry in data structure 157 that provides the encryption parameters 224 and the SPI 226, as shown in FIG. 2B and described above.

In block B310, an I/O operation to transmit or receive secured encrypted data is initiated and described below with respect to FIGS. 3B and 3C.

Figure 3B:
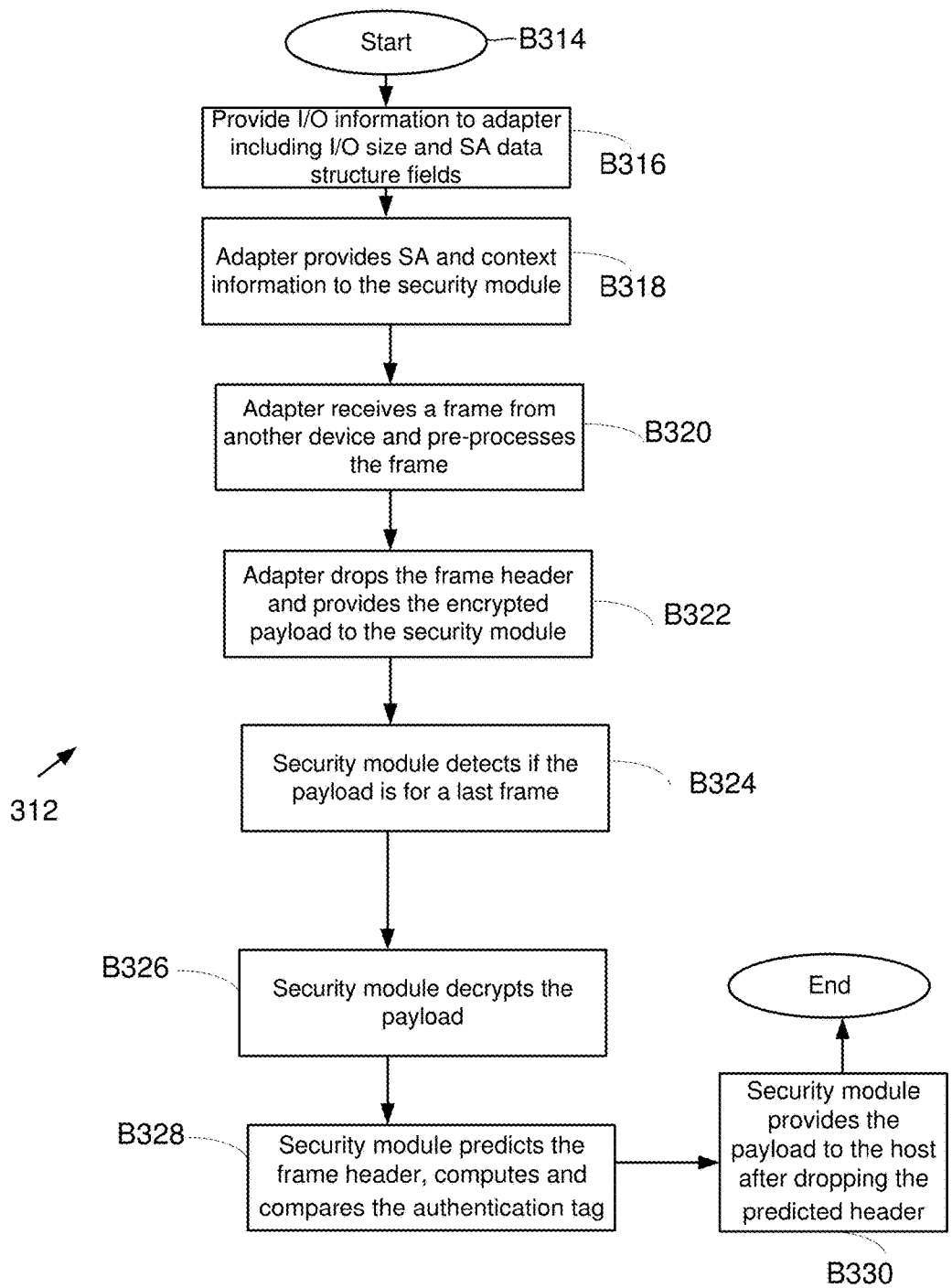

FIG. 3B shows a process 312 for managing encrypted frames received by adapter 116, according to one aspect of the present disclosure. The process begins in block B314 after data structure 157 and 159 have been configured as described above with respect to FIG. 3A. In block B316, host driver 144 communicates with the adapter 116 using an IOCB. The IOCB describes the I/O operation (i.e. a read request to read data from storage device 136) and a scatter gather list that indicates where the read data is to be stored at host memory.

In block B318, the adapter 116 provides a workflow handle 220 and context information associated with the workflow handle. The context information includes all the information that is needed to predict the frame header. For example, the context information provides an operation code that describes an operation that needs to be performed, i.e. the operation code indicates that a decryption operation needs to be performed for a received frame or an encryption operation needs to be performed for a transmit frame, described below with respect to FIG. 3C. The context information also indicates the block size that is used for the received frame. The context information further provides a pointer to the SA handle for the workflow handle. The context information further includes the length i.e. the number of unencrypted bytes associated with the operation. The context information further includes the OX_ID, RX_ID, SEQ_ID, initial SEQ_CNT, total I/O sequence length and other control bits that are mentioned above and used to predict the FC header 204.

In block B320, a frame is received at the adapter 116. The adapter 116 pre-processes the frame using the FC header 204. The FC header 204 is dropped and the encrypted payload is provided to the security module 150 via link 151.

Figure 4:
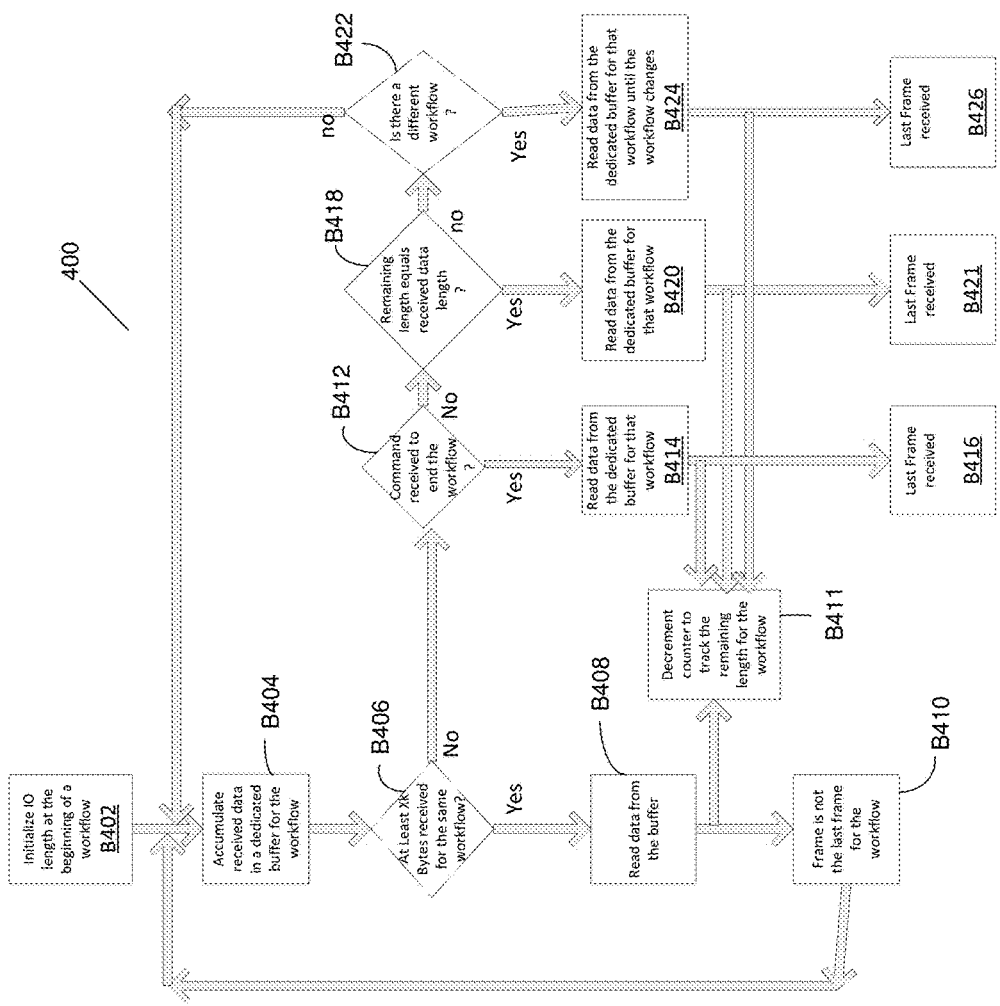
FIG. 4 shows a process flow for detecting a last frame by a security module, according to one aspect of the present disclosure.

In block B324, the security module 150 detects if the frame is the last frame of a sequence. The process for detecting the last frame is shown in FIG. 4 and described below in detail.

In block B326, the security module 150 first obtains the SA handle 222 from the workflow handle 220 using data structure 159. The SA handle 222 provides the encryption parameters 224 and SPI 226 at data structure 157. Using the encryption parameters, the security module 150 decrypts the payload and compares the SPI 226. If there is no match, an error is flagged. The FC header is also created/predicted by the security module 150 based on the parameter list described above in detail.

In block B328, the security module 150 computes the authentication tag 214 and compares it with the received authentication tag. If there is no match, an error is flagged. If there is a match, then in block B330, the security module 150 provides the decrypted payload to the host system 102 after dropping the FC header, the ESP header the IV bytes, the authentication tag and the padding. For all errors, the adapter 116 is notified so that it obtains the data for which an error was detected.

Figure 3C:
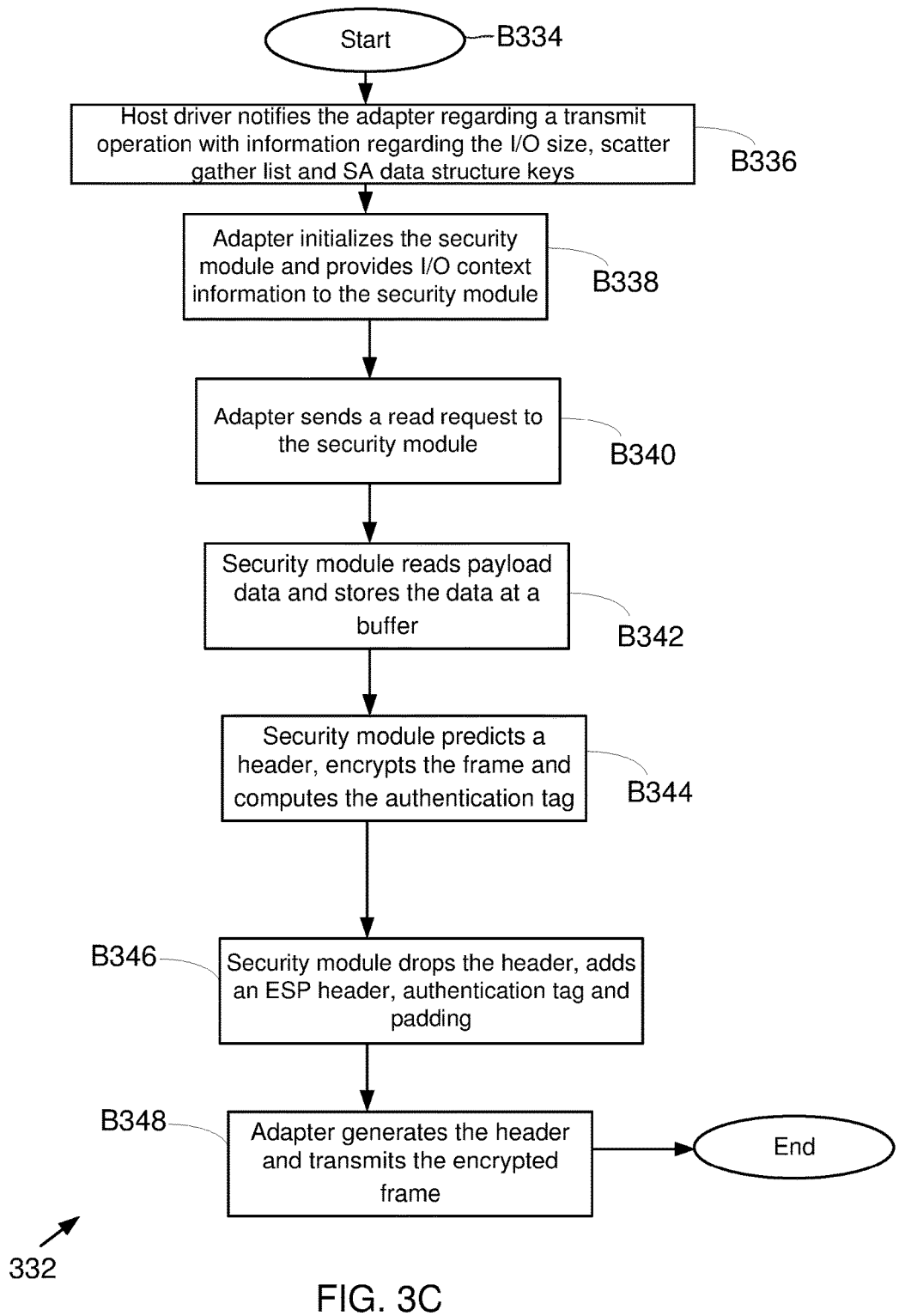

FIG. 3C shows a process 332 for encrypting data received by the security module 150 from the host system 102 and then using adapter 116 to transmit the frame, according to one aspect of the present disclosure. The process begins in block B334, when the host system 102, security module 150 and adapter 116 are operational.

In block B336, the driver 144 notifies the adapter 116 regarding a transmit operation. The notification maybe in an IOCB and includes the I/O size, the scatter gather list indicating where at host memory 106 data is stored, information regarding the SA data structure 157 associated with the I/O operation and any other information.

In block B338, the adapter 116 after receiving the information from the driver 144, initializes the security module 150 and provides context information as well as the workflow handle 220 to retrieve the SA handle 222 associated with the context from data structure 159. The various context information fields have been described above with respect to FIG. 3B and for brevity sake, are not being repeated.

In block B340, the adapter 116 sends a read request to the security module 150. The adapter 116 is aware of the total size of the I/O operation and hence knows how many frames have to be read, if data is fetched in fixed size blocks, for example, 2k.

After receiving the read request, the security module 150 in block B342, retrieves a first chunk of data, for example, 2k and pre-fetches the next 2K bytes to reduce latency. The fetched data is stored at a buffer, for example, at memory 158 or any other location.

In block B344, the encryption module 160 using the SA handle 222 retrieves the encryption parameters 224 and encrypts the payload appropriately. The header prediction module 161 predicts the FC header and based on that the authentication tag 214 is computed by the encryption module 160. Thereafter, in block B346, the predicted header is dropped, an ESP header 206, authentication tag 214 and padding bytes 212 are added to the frame. The security module 150 provides the encrypted payload to the adapter 116. The adapter 116 then generates a header and transmits the frame with the header to its destination in block B348.

FIG. 4 shows a process 400 executed by the security module 150 to detect a last frame, according to one aspect of the present disclosure. The process begins in block B402, when an I/O length is initialized at the beginning of a workflow for receiving or transmitting a frame by the adapter 116. This enables the adapter to know the overall I/O size. In block B404, the security module 150 stores received data at a buffer. The data maybe from the host system 102 or from a network device/storage device 136.

In block B406, the security module 150 determines if the received data is of at least a certain size (Xk), for example, 2K bytes of data. If yes, then the data is read from the buffer for processing in block B408 and the security module 150 concludes that the received frame is not the last frame (shown in block B410) and the process reverts back to block B404. Since the frame is not the last frame, in block B411, the workflow counter 166 is decremented so that the remaining frames for the workflow can be tracked.

If in block B406, the security module 150 determines that Xk bytes (for example, 2k) of data has not been received, the process moves to block B412 where the security module 150 determines if a command has been received from the adapter 116 to end the workflow. If yes, then the data is read from the buffer in block B414, and the security module 150 concludes that the data received in block B404 is for the last frame (as shown in block B416). The workflow counter 166 is also decremented to indicate that the last frame has been received.

If in block B412, the security module 150 did not receive a command to end a particular workflow, then the process moves to block B418 when the security module 150 determines if the remaining workflow length as tracked by the workflow counter 166 is equal to the received data length. If yes, then in block B420, the data is read from the buffer and the security module 150 concludes that the last frame has been received, as shown in block B421. The workflow counter 166 is also decremented in block B411 indicating the last frame for the workflow.

If in block B418, the security module 150 determines if the remaining workflow length is not equal to received data, then in block B422, the security module 150 determines if the data is for a different workflow, for example, another workflow for the same PCI function number. If not, the process reverts back to block B404. If yes, then the data is read from the buffer in block B424, the workflow counter 166 is decremented in block B411 and the security module 150 determines that the last frame has been received, as shown in block B426. The process continues to monitor frames for a last frame.

In one aspect, the systems and methods described above have various advantages. It provides an efficient solution for securing Fibre Channel frames complying with the FC-SP-2 standard without having to make major changes to the host bus adapters or host side code. Thus additional gates for host bus adapters are not needed for encrypting or decrypting frames.

The above description presents the best mode contemplated for carrying out the present aspects, and of the manner and process of making and using them, in such full, clear, concise, and exact terms as to enable any person skilled in the art to which they pertain to make and use these aspects. These aspects are, however, susceptible to modifications and alternate constructions from that discussed above that are fully equivalent. For example, the aspects disclosed herein are applicable to any peripheral device and are not limited to any particular adapter type. Consequently, these aspects are not limited to the particular aspects disclosed. On the contrary, these aspects cover all modifications and alternate constructions coming within the spirit and scope of the aspects as generally expressed by the following claims, which particularly point out and distinctly claim the subject matter of the aspects.

What is claimed is:

1. A machine implemented method, comprising:
providing context information associated with a workflow handle for an input/output (I/O) operation to a security module by an adapter communicating with a computing device and a storage device via a network, the I/O operation is one of a read request to retrieve data from the storage device by the adapter and a write request to transmit data on behalf of the computing device by the adapter; wherein the context information includes a plurality of header fields that remain constant during an I/O sequence for the I/O operation and include information to predict frame headers by the security module without examining any frame headers that are transmitted and received by the adapter;
storing encryption parameters associated with a security association handle by the security module, the security association handle associated with the workflow handle and the context information;
using the workflow handle by the security module to obtain the security association handle for retrieving stored encryption parameters for encrypting payload transmitted by the adapter for the write request and for decrypting payload received by the adapter for the read request;
wherein for the write request:
only using the context information by the security module for predicting a first frame header for encrypting the payload to be transmitted by the adapter;
providing the encrypted payload for transmission to the adapter by the security module after discarding the first predicted header;
appending a header for the encrypted payload by the adapter, before transmitting the encrypted payload; and
wherein for the read request:
receiving a frame with the payload by the adapter;
discarding the frame header by the adapter and providing the payload to the security module for decryption;
only using the context information by the security module for predicting a second frame header for decrypting the payload in the received frame by the adapter; and
providing the decrypted payload to the computing device by the security module, after discarding the second predicted header.

2. The method of claim 1, wherein the security module communicates with the computing device using a PCI-Express link.

3. The method of claim 1, wherein the adapter is a host bus adapter that communicates with the security module using a PCI-Express link.

4. The method of claim 1, wherein the first predicted frame header and the second predicted frame header are Fibre Channel headers for received and transmitted Fibre Channel frames.

5. The method of claim 4, wherein the adapter pre-processes a received encrypted Fibre Channel frame, discards a header from the received Fibre Channel frame and the security module predicts the Fibre Channel header.

6. The method of claim 4, wherein to transmit an encrypted Fibre Channel frame, the adapter adds the Fibre Channel frame header, after the frame is encrypted by the security module.

7. The method of claim 4, wherein the security module computes and compares an authentication tag to decrypt an encrypted Fibre Channel frame.

8. A non-transitory, machine readable storage medium having stored thereon instructions for performing a method, comprising machine executable code which when executed by at least one machine, causes the machine to:
provide context information associated with a workflow handle for an input/output (I/O) operation to a security module by an adapter communicating with a computing device and a storage device via a network, the I/O operation is one of a read request to retrieve data from the storage device by the adapter and a write request to transmit data on behalf of the computing device by the adapter; wherein the context information includes a plurality of header fields that remain constant during an I/O sequence for the I/O operation and include information to predict frame headers by the security module without examining any frame headers that are transmitted and received by the adapter;
store encryption parameters associated with a security association handle by the security module, the security association handle associated with the workflow handle and the context information;
use the workflow handle by the security module to obtain the security association handle for retrieving stored encryption parameters for encrypting payload transmitted by the adapter for the write request and for decrypting payload received by the adapter for the read request;
wherein for the write request:

only using the context information by the security module for predicting a first frame header for encrypting the payload to be transmitted by the adapter;

provide the encrypted payload for transmission to the adapter by the security module after discarding the first predicted header;

append a header for the encrypted payload by the adapter, before transmitting the encrypted payload; and wherein for the read request:

receive a frame with the payload by the adapter;

discard the frame header by the adapter and providing the payload to the security module for decryption;

only using the context information by the security module for predicting a second frame header for decrypting the payload in the received frame by the adapter; and provide the decrypted payload to the computing device by the security module, after discarding the second predicted header.

9. The non-transitory, storage medium of claim 8, wherein the security module communicates with the computing device using a PCI-Express link.

10. The non-transitory, storage medium of claim 8, wherein the adapter is a host bus adapter that communicates with the security module using a PCI-Express link.

11. The non-transitory, storage medium of claim 8, wherein the first predicted frame header and the second predicted frame header are Fibre Channel headers for received and transmitted Fibre Channel frames.

12. The non-transitory, storage medium of claim 11, wherein the adapter pre-processes a received encrypted Fibre Channel frame, discards a header from the received Fibre Channel frame and the security module predicts the Fibre Channel header.

13. The non-transitory, storage medium of claim 11, wherein to transmit an encrypted Fibre Channel frame, the adapter adds the Fibre Channel frame header, after the frame is encrypted by the security module.

14. The non-transitory, storage medium of claim 11, wherein the security module computes and compares an authentication tag to decrypt an encrypted Fibre Channel frame.

15. A system comprising:

a computing device having a processor executing instructions out of a memory and interfacing with an adapter that receives frames from another device and transmits frames to the other device; and a security module coupled to the computing device and the adapter;

wherein the adapter provides context information associated with a workflow handle for an input/output (I/O) operation to the security module, where the I/O operation is one of a read request to retrieve data from the storage device by the adapter and a write request to transmit data on behalf of the computing device by the adapter;

wherein the context information includes a plurality of header fields that remain constant during an I/O sequence for the I/O operation and include information to predict frame headers by the security module without examining any frame headers that are transmitted and received by the adapter;

wherein the security module stores encryption parameters associated with a security association handle that is associated with the workflow handle and the context information; uses the workflow handle to obtain the security association handle for retrieving stored encryption parameters for encrypting payload transmitted by the adapter for the write request and for decrypting payload received by the adapter for the read request;

wherein for the write request, the security module predicts a first frame header by only using the context information for encrypting the payload transmitted by the adapter; provides the encrypted payload for transmission to the adapter, after discarding the first predicted header; and the adapter appends a header for the encrypted payload, before transmitting the encrypted payload; and wherein for the read request, the adapter discards the frame header for a frame received by the adapter, and the security module uses the context information to predict a second frame header for decrypting the payload and then provides the decrypted payload to the computing device, after discarding the second predicted header.

16. The system of claim 15, wherein the security module communicates with the computing device using a PCI-Express link.

17. The system of claim 15, wherein the adapter is a host bus adapter that communicates with the security module using a PCI-Express link.

18. The system of claim 15, wherein the first predicted frame header and the second predicted frame header are Fibre Channel headers for received and transmitted Fibre Channel frames.

19. The system of claim 18, wherein the adapter pre-processes a received encrypted Fibre Channel frame, discards a header from the received Fibre Channel frame and the security module predicts the Fibre Channel header.

20. The system of claim 18, wherein to transmit an encrypted Fibre Channel frame, the adapter adds the Fibre Channel frame header, after the frame is encrypted by the security module.

* * * * *